US011376975B2

(12) United States Patent
Eberlein

(10) Patent No.: US 11,376,975 B2
(45) Date of Patent: Jul. 5, 2022

(54) DISCHARGE CIRCUIT AND METHOD FOR DISCHARGING A HIGH-VOLTAGE DC LINK OF A VEHICLE

(71) Applicant: Robert Bosch GmbH, Stuttgart (DE)

(72) Inventor: Edwin Eberlein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 16/617,734

(22) PCT Filed: May 16, 2018

(86) PCT No.: PCT/EP2018/062689
§ 371 (c)(1),
(2) Date: Jan. 20, 2020

(87) PCT Pub. No.: WO2018/219643
PCT Pub. Date: Dec. 6, 2018

(65) Prior Publication Data
US 2020/0189410 A1 Jun. 18, 2020

(30) Foreign Application Priority Data

May 31, 2017 (DE) ...................... 10 2017 209 100.2

(51) Int. Cl.
*H02J 7/00* (2006.01)
*B60L 53/22* (2019.01)
(Continued)

(52) U.S. Cl.
CPC ............ *B60L 53/22* (2019.02); *B60L 15/007* (2013.01); *H02J 7/0029* (2013.01);
(Continued)

(58) Field of Classification Search
USPC ................................ 320/134, 135, 136, 137
See application file for complete search history.

(56) References Cited

U.S. PATENT DOCUMENTS

2011/0278918 A1* 11/2011 Shindo ...................... B60L 3/04
307/9.1
2012/0268079 A1* 10/2012 Nakamura ............ H02J 7/0031
320/166
(Continued)

FOREIGN PATENT DOCUMENTS

CN           105270182 A  *  1/2016
DE           102009055053       6/2011
(Continued)

OTHER PUBLICATIONS

International Search Report for Application No. PCT/EP2018/062689 dated Aug. 27, 2018 (English Translation, 2 pages).

*Primary Examiner* — Brian Ngo
(74) *Attorney, Agent, or Firm* — Michael Best & Friedrich LLP

(57) ABSTRACT

The invention relates to a discharge circuit (10) for discharging a high-voltage DC link (20) of a vehicle. The high-voltage DC link (20) comprises a DC link capacitor (30) to which a high voltage (U_H) is applied. The discharge circuit (10) is designed to adjust the level of the discharge current (I_D) provided by the discharge circuit (10) depending on the high voltage (U_H).

10 Claims, 3 Drawing Sheets

(51) Int. Cl.
  *B60L 15/00*   (2006.01)
  *H02J 7/34*   (2006.01)
  *H02M 1/32*   (2007.01)
  *H02M 7/537*   (2006.01)

(52) U.S. Cl.
  CPC ............ *H02J 7/0063* (2013.01); *H02J 7/345* (2013.01); *H02M 1/32* (2013.01); *H02M 7/537* (2013.01); *B60L 2210/10* (2013.01); *H02J 2310/48* (2020.01); *H02M 1/322* (2021.05)

(56)    References Cited

U.S. PATENT DOCUMENTS

| | | |
|---|---|---|
| 2016/0233688 A1 | 8/2016 | Ker et al. |
| 2017/0022955 A1* | 1/2017 | Steele .................. F02N 11/087 |
| 2017/0077730 A1 | 3/2017 | Berg et al. |

FOREIGN PATENT DOCUMENTS

| | | |
|---|---|---|
| DE | 102013224884 | 6/2015 |
| DE | 102015217533 | 3/2017 |
| DE | 102016222632 A1 | 5/2018 |
| EP | 2284982 | 2/2011 |
| WO | 2009106187 | 9/2009 |
| WO | 2015082193 | 6/2015 |

\* cited by examiner

DISCHARGE CIRCUIT AND METHOD FOR DISCHARGING A HIGH-VOLTAGE DC LINK OF A VEHICLE

BACKGROUND OF THE INVENTION

The invention relates to a discharging circuit and to a method for discharging a high-voltage DC link of a vehicle. Further, the invention relates to a drive train having a discharging circuit and to a vehicle having a drive train. Further, the invention relates to a computer program and to a machine-readable storage medium.

WO 2009/106187 A1 discloses a method and an apparatus for discharging a high-voltage electrical system. In conventional vehicles, the voltage in the vehicle electrical system is approximately 14 volts. In hybrid vehicles or vehicles with electrical propulsion, voltages that can amount to several 100 volts are used in the traction electrical system. Voltages higher than 60 volts are referred to as high voltage. For safety reasons, high-voltage electrical systems, in particular vehicle electrical systems or traction electrical systems, must be disconnectable and able to be discharged. For this purpose, known high-voltage electrical systems comprise an active and/or a passive discharging apparatus. This apparatus normally consists of a two-pole main switch for isolating the battery from the rest of the electrical system and also suitable circuits, for example a switchable resistor, via which the charge is dissipated when required. A passive discharging normally consists of at least one resistor connected in parallel with the energy store and with the high-voltage electrical system. Passive discharging circuits of this kind are configured to discharge a DC link capacitance that is in the high-voltage electrical system, in particular what is known as a DC link capacitor, to a voltage below 60 volts (touch safety) within a prescribed time, for the most part 120 seconds, regardless of an initially occurring voltage. There is a need to provide alternative discharging methods and apparatuses for high-voltage electrical systems of vehicles.

SUMMARY OF THE INVENTION

A discharging circuit for discharging a high-voltage DC link of a vehicle is provided. The high-voltage DC link comprises a DC link capacitor. The DC link capacitor has a high voltage across it. The discharging circuit is configured to take the high voltage as a basis for adjusting, in particular variably adjusting, the level of a discharging current through the discharging circuit.

A discharging circuit for discharging a high-voltage DC link is provided. The high-voltage DC link comprises a DC link capacitor, the high-voltage side of which is connected, for example for the operation of an electrical machine, between a pulse-controlled inverter and a high-voltage battery to smooth the current and voltage spikes arising during the operation of the pulse-controlled inverter. The DC link capacitor has a high voltage across it. The discharging circuit is connected in parallel with the DC link capacitor, so that the high voltage is also present at the input connections of the discharging circuit. The discharging circuit is configured to take the level of the high voltage as a basis for adjusting, in particular variably, the level of a discharge current through the discharging circuit. On the basis of the level of the high voltage, the discharging circuit sets a higher or lower discharge current through the discharging circuit, in particular gradually or continuously. The discharging circuit can comprise in particular a DC-DC converter, a flyback converter. The adjustment of the discharge current on the basis of the high voltage can be implemented by means of a hardware circuit, for example, or can be controlled by means of a logic unit on the basis of a voltage measurement by software. A hardware circuit comprises for example a voltage or potential divider by means of which, depending on a configuration of the resistors connected in series, an appropriate discharge takes place for a prescribed high voltage. The further control of the discharge current is provided by means of a differential amplifier, for example. Advantageously, a discharging circuit for discharging a high-voltage DC link of a vehicle is provided.

In another configuration of the invention, the discharge current through the discharging circuit becomes larger as the high voltage falls if the high voltage is below a lower operating voltage value.

The high-voltage DC link is used to supply an electrical drive train with electrical energy, for example. For the operation of the electrical drive train, the high voltage is in a prescribable range. If the electrical drive train is not needed or an integrity violation is detected, the high voltage needs to be lowered below the touch voltage within prescribed times in order to lower the risk of endangerment. In particular if the high voltage becomes too low, operation of the drive train as intended is no longer possible. To lower the risk of endangerment, the voltage in the high-voltage DC link is therefore reduced as quickly as possible as soon as it falls to a value that is below the normal operating range. The discharge current through the discharging circuit therefore becomes larger, in particular continuously, as the high voltage falls if the high voltage is below an, in particular prescribable, lower operating voltage value. This operating voltage value corresponds for example to the limit below which operation of the drive train as intended (for example avoidance of damage to the high-voltage battery; avoidance of poor efficiency; assurance of the provision of specified output power) can no longer be ensured. Advantageously, a discharging circuit is provided that ensures reliable operation of the high-voltage DC link and accelerated discharge in the event of reliable operation no longer being able to be ensured.

In another configuration of the invention, the discharge current is controlled by means of the discharging circuit.

The discharge current through the discharging circuit can be controlled by means of hardware or software. A hardware circuit may be configured such that the level of the discharge current changes on the basis of the high voltage. To this end, the hardware circuit can comprise for example a potential divider comprising a resistor series connection, the center tap of which has in particular the gate of a transistor for switching the discharge current connected to it. The level of the discharge current can in principle alternatively be adjusted by means of a logic unit, for example a microcontroller, on the basis of a measured high voltage. Besides the dependence on the high voltage, it is also possible for further parameters, for example the level of the discharge current itself, to be used as control parameters. By way of example, the discharge current can be limited to a maximum discharge current. Advantageously, an improved discharging circuit for discharging a high-voltage DC link of a vehicle is provided.

In another configuration of the invention, the discharging current through the discharging circuit becomes minimal if the high voltage is below a touch voltage value.

The discharging circuit is used for the dependability of the high-voltage DC link. If the high voltage of the high-voltage DC link has fallen below a touch voltage value, for example 60 volts, the electrical energy in the high-voltage DC link no longer presents a danger. Further discharge of the high-voltage DC link is therefore not necessary. The discharge current through the discharging circuit therefore becomes minimal if the high voltage is below the touch voltage value. Advantageously, an improved discharging circuit for discharging a high-voltage DC link of a vehicle is provided.

In another configuration of the invention, the discharging circuit comprises a load resistor as load.

To quickly consume the electrical energy of the high-voltage DC link, the discharging circuit comprises an electrical load. This can be a load resistor, for example, and, in particular for a quick discharge, is a low-value load resistor. Advantageously, an option for a load of a discharging circuit is provided.

Further, the invention relates to a drive train having a discharging circuit and in particular having power electronics and/or a high-voltage battery and/or an electrical drive.

Such a drive train is used for example for propelling an electric vehicle. The method and the apparatus allow reliable operation of the drive train, in particular allow reliable discharge of the high-voltage DC link of the drive train.

Further, the invention relates to a vehicle having an apparatus as described. Advantageously, a vehicle is therefore provided that comprises an apparatus that is used to efficiently discharge a high-voltage DC link.

Further, the invention comprises a method for discharging a high-voltage DC link of a vehicle. The high-voltage DC link comprises a DC link capacitor, across which there is a high voltage. Further, there is provision for a discharging circuit. The method comprises the steps of: ascertaining the high voltage; adjusting an, in particular variable, discharge current through the discharging circuit on the basis of the ascertained high voltage.

A method for discharging a high-voltage DC link is provided. The high-voltage DC link comprises a DC link capacitor, the high voltage side of which is connected, for example for the operation of an electrical machine, between a pulse-controlled inverter and a high-voltage battery to smooth the current and voltage spikes arising during the operation of the pulse-controlled inverter. The DC link capacitor has a high voltage across it. The discharging circuit is connected in parallel with the DC link capacitor, so that the high voltage is also present at the input connections of the discharging circuit. The method comprises ascertaining the high voltage. This is effected for example by means of known measuring methods or by means of a hardware circuit. Subsequently, a discharge current through the discharging circuit is adjusted, in particular variably, on the basis of the ascertained high voltage. Advantageously, a method for discharging a high-voltage DC link of a vehicle is provided.

Further, the invention relates to a computer program configured to carry out the method described hitherto.

Further, the invention relates to a machine-readable storage medium on which the described computer program is stored.

It goes without saying that the features, properties and advantages of the apparatus according to the invention apply or are applicable accordingly to the method and the drive train and the vehicle, and vice versa.

BRIEF DESCRIPTION OF THE DRAWINGS

Further features and advantages of embodiments of the invention emerge from the description below with reference to the accompanying drawings.

The invention will be explained in more detail below with reference to a few figures, in which.

DETAILED DESCRIPTION

Figure 1:
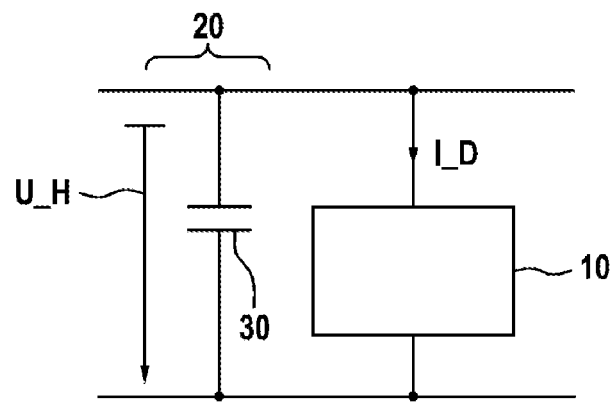
FIG. 1 shows a schematic depiction of the discharging circuit for discharging a high-voltage DC link of a vehicle.

FIG. 1 shows, in exemplary fashion, a high-voltage DC link comprising a DC link capacitor 30. The DC link capacitor 30 has the high voltage $U\_H$ across it. Connected in parallel with the DC link capacitor 30 is the discharging circuit 10 for discharging the high-voltage DC link 20. To discharge the high-voltage DC link 20, a discharge current $I\_D$ flows through the discharging circuit 10. The discharging circuit 10 is configured to take the high voltage $U\_H$ as a basis for adjusting the level of the discharge current $I\_D$ through the discharging circuit 10.

Figure 2:
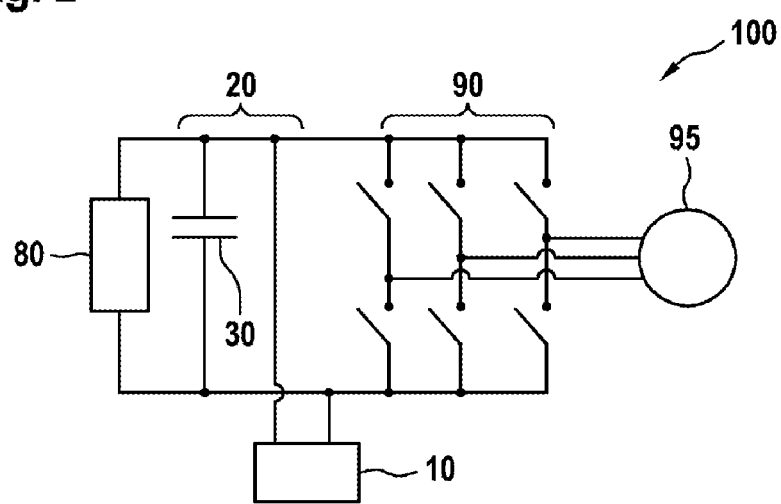
FIG. 2 shows a schematically depicted drive train.

FIG. 2 shows an electrical drive train 100 having a discharging circuit 10 for discharging the high-voltage DC link 20, which comprises a DC link capacitor 30. The discharging circuit 10 is electrically connected to the high-voltage DC link 20 in parallel with the DC link capacitor 30. In particular, the electrical drive train 100 comprises a battery 80 or comparable energy sources, and/or a pulse-controlled inverter 90, which is depicted as a B6 bridge in FIG. 2, or comparable control units for an electrical drive and/or an electrical machine 95. In particular to supply power to the electrical machine 95, the high-voltage DC link 20 is in particular coupled by means of a pulse-controlled inverter 90 that transports the electrical energy from the battery 80 to the electrical machine 95, or vice versa.

Figure 3:
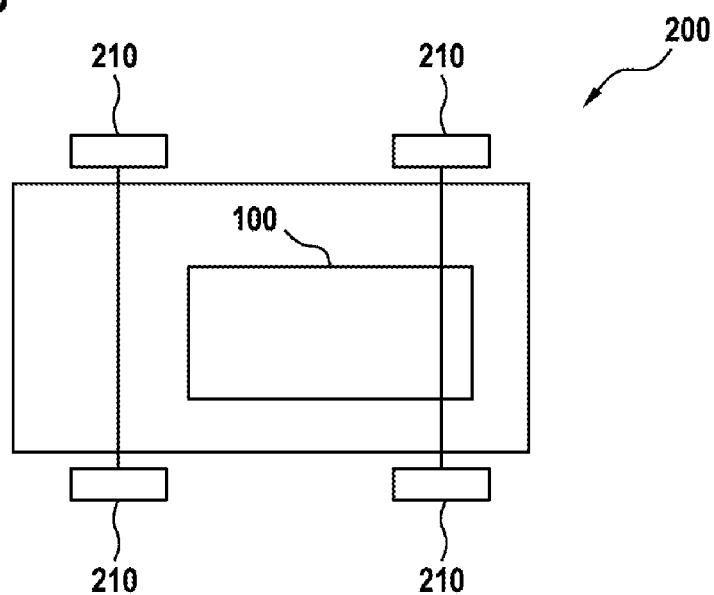
FIG. 3 shows a schematically depicted vehicle having a drive train.

FIG. 3 shows a schematically depicted vehicle 200 having a drive train 100 that, to propel the vehicle 200, is configured to drive at least one wheel 210 of the vehicle. The depiction shows a vehicle 200 having four wheels 210 in exemplary fashion, the invention being equally employable in any vehicles having any number of wheels on land, on water and in the air.

Figure 4:
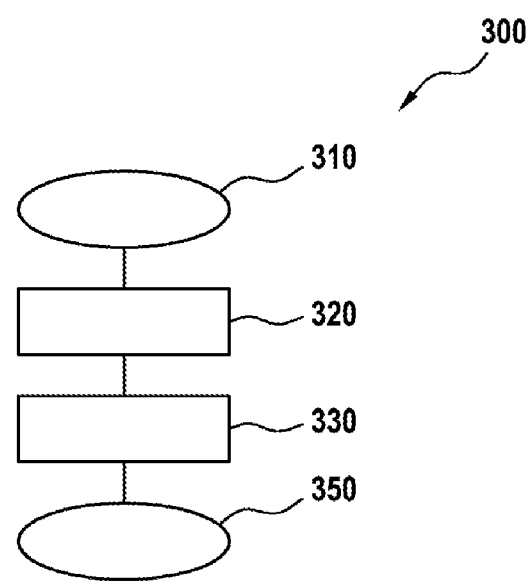
FIG. 4 shows a schematically depicted flowchart for a method for discharging a high-voltage DC link of a vehicle.

FIG. 4 shows a schematic sequence for a method 300 for discharging a high-voltage DC link 20 of a vehicle. In step 310, the method begins. The high voltage $U\_H$ across the DC link capacitor 30 is ascertained in step 320. On the basis of the ascertained high voltage $U\_H$, the discharge current $I\_D$ through the discharging circuit 10 is adjusted in step 330. In particular periodic repetition of the steps 310 . . . 330 takes place at least until the high voltage has dropped below the prescribed limit value. In particular as the high voltage rises, the method starts autonomously. In step 350, the method ends.

Figure 5:
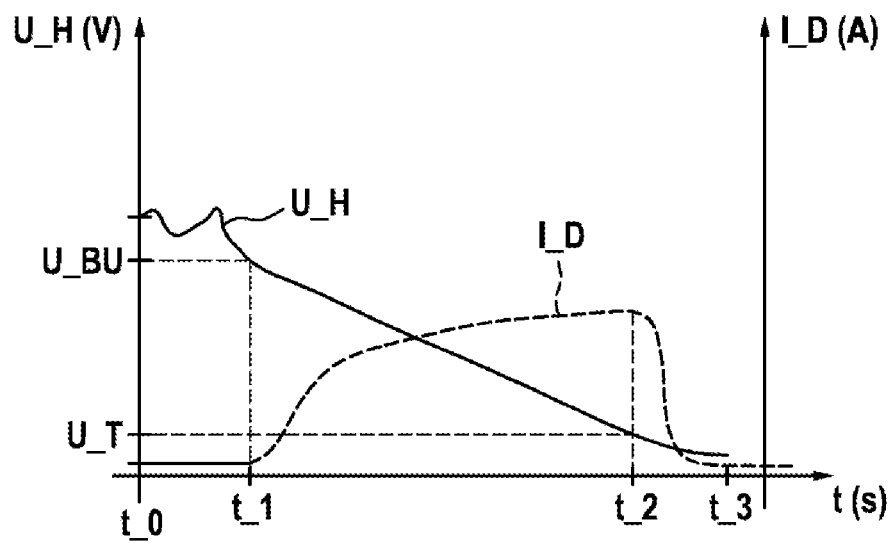
FIG. 5 shows a schematically depicted graph of voltage, current and time.

FIG. 5 shows a graph in which the high voltage across the high-voltage DC link $U\_H$ (V) and the discharge current $I\_D$ (A) through the discharging circuit 10 are plotted over time t (s). At the instant $t\_0$, the high voltage $U\_H$ is above a lower operating voltage value $U\_BU$. So long as the high voltage $U\_H$ does not drop below this lower operating voltage value $U\_BU$, the discharge current $I\_D$ is minimal, and preferably no discharge current $I\_D$ flows through the discharging circuit 10, since the high-voltage DC link is operating as intended. In particular, a minimal discharge current I_D on the basis of a minimum discharge can flow through circuit components of the pulse-controlled inverter that are present anyway. In particular this means that the high voltage U_H falls when the connection to the high voltage battery 80 is broken. As soon as the high voltage U_H drops below the lower operating voltage value U_BU, the high-voltage DC link is not in the intended operating state. The discharge current I_D through the discharging circuit 10 therefore increases and continues to rise as the high voltage U_H falls. In this regard, the discharge current I_D flows through an electrical load, for example through a load resistor. The discharging circuit 10 preferably controls the discharge current I_D such that the high-voltage DC link 20 is discharged at the maximum power of the load. This discharge process lasts for example until the high voltage U_H has fallen to a value below the touch voltage U_T (for example 60 volts). If the high voltage U_H is below the touch voltage value U_T, the high-voltage DC link presents no danger to living things. Further discharge is therefore not absolutely necessary. Accordingly, the discharge current I_D through the discharging circuit 10 falls further after the instant t_2 and therefore reaches a minimal value again at a later instant t_3.

Figure 6:
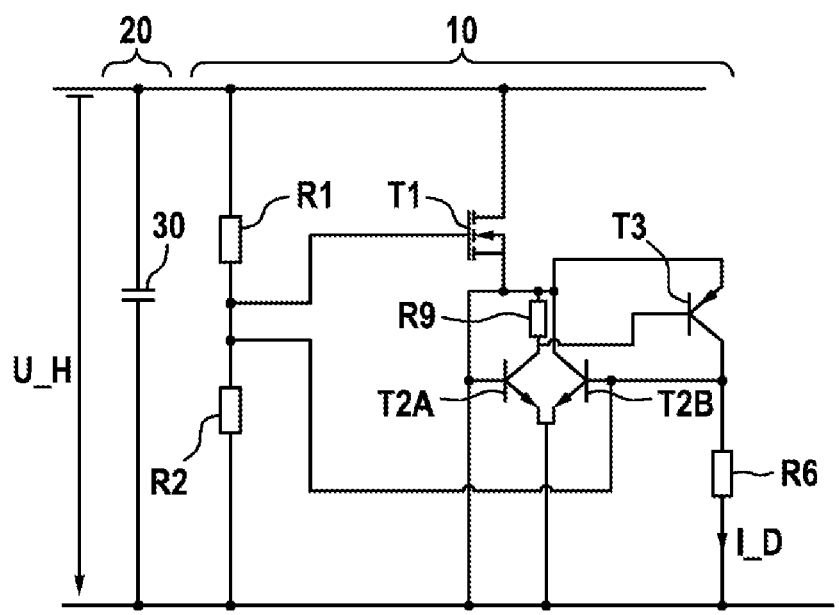
FIG. 6 shows a schematically depicted circuit topology for a discharging circuit for discharging a high-voltage DC link.

FIG. 6 shows a simplified circuit topology for a discharging circuit 10 of a high-voltage DC link 20 having a DC link capacitor 30. The DC link capacitor 30 has the high voltage U_H across it. The input of the discharging circuit 10 is formed by a voltage divider comprising the series-connected resistors R1 and R2, which are connected in parallel with the DC link capacitor 30. The dimensioning of the resistors R1 and R2 is used to adjust the voltage ratio between the voltage at the center tap between the resistors R1 and R2 and the high voltage U_H. The voltage at the center tap between the resistors R1 and R2 is used for example as the gate voltage for the switch T1, for example, which, in the closed state, allows a discharge current from the high potential of the DC link capacitor 30 via a load resistor R6 as load to the low potential of the DC link capacitor 30. Further, the intermediate tap between the resistors R1 and R2 serves as a comparison base for the differential amplifier comprising the resistor R9 and the two transistors T2A and T2B. The base of the transistor T2B is connected to the load resistor and to the center tap between the resistors R1 and R2, so that given suitable dimensioning of resistors (not depicted) on these connecting lines, a percentage of the high voltage and the voltage across the discharging resistor, or load resistor R6, adds up. This sum is compared with a setpoint value, which is dimensioned by means of the resistor R2, using the differential amplifier by means of the transistors T2A and T2B and actuates a further transistor T3, which therefore adjusts the discharge current I_D. The following ranges are obtained for the high voltage U_H: above the lower operating voltage value U_BU, the voltage across the resistor R2 is so high that the current through the load resistor R6 is set to 0 A. In the range below the lower operating voltage value U_BU and above the touch voltage U_T, the sum of the voltage across the load resistor R6 and across the resistor R2 is constant, i.e. the discharge current I_D rises as the high voltage U_H falls. Below the touch voltage U_T, the current through the load resistor R6 is limited to a maximum value on the basis of the dimensioning and falls to 0 A again when the high voltage U_H is low on account of a falling supply voltage for the circuit.

The invention claimed is:

1. A discharging circuit (10) for discharging a high-voltage DC link (20) of a vehicle,
    wherein the high-voltage DC link (20) comprises a DC link capacitor (30), across which there is a high voltage (U_H);
    wherein the discharging circuit (10) is connected in parallel between the DC link capacitor (30) and an inverter circuit (90);
    wherein the discharging circuit (10) comprises a voltage divider at an input of the discharge circuit (10), the voltage divider including a resistor pair (R1, R2) connected in parallel with the DC link capacitor (30), and
    wherein the discharging circuit (10) is configured to adjust a level of a discharge current (I_D) through the discharging circuit (10) based on the high voltage (U_H).

2. The discharging circuit (10) as claimed in claim 1,
    wherein the discharge current (I_D) through the discharging circuit (10) becomes larger as the high voltage (U_H) falls if the high voltage (U_H) is below a lower operating voltage value (U_H).

3. The discharging circuit (10) as claimed in claim 2, wherein the discharge current (I_D) is controlled by the discharging circuit (10).

4. The discharging circuit (10) as claimed in claim 1, wherein the discharging current (I_D) through the discharging circuit (10) becomes minimal if the high voltage (U_H) is below a touch voltage value (U_T).

5. The discharging circuit (10) as claimed in claim 1, wherein the discharging circuit (10) comprises a load resistor (R6) as load.

6. A drive train (100) having a discharging circuit (10) as claimed in claim 1.

7. A vehicle (200) having a drive train (100) as claimed in claim 6.

8. The discharging circuit of claim 1, wherein a center tap between the resistor pair (R1, R2) is used as a gate voltage for a switch (T1) of the discharging circuit (10), wherein the switch (T1) in a closed state, allows a discharge current from a high potential of the DC link capacitor (30) via a load resistor (R6) as load to a low potential of the DC link capacitor 30.

9. A method (300) for discharging a high-voltage DC link (20) of a vehicle,
    wherein the high-voltage DC link (20) comprises a DC link capacitor (30), across which there is a high voltage (U_H);
    and there is provision for a discharging circuit (10), having the steps of:
    ascertaining (320) the high voltage (U_H);
    adjusting (330) a discharge current (I_D) through the discharging circuit (10) on the basis of the ascertained high voltage (U_H) wherein the discharging circuit (10) comprises a voltage divider at an input of the discharge circuit (10), the voltage divider including a resistor pair (R1, R2) connected in parallel with the DC link capacitor (30); and
    wherein the discharging circuit (10) is connected in parallel between the DC link capacitor (30) and an inverter circuit (90).

10. A non-transitory machine-readable storage medium having a computer program configured to carry out the method (300) as claimed in claim 9 stored thereupon.

* * * * *